United States Patent
Das et al.

(10) Patent No.: US 8,938,473 B2
(45) Date of Patent: Jan. 20, 2015

(54) SECURE WINDOWING FOR LABELED CONTAINERS

(75) Inventors: Lokanath Das, San Jose, CA (US); Glenn T. Faden, San Rafael, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1486 days.

(21) Appl. No.: 11/361,141

(22) Filed: Feb. 23, 2006

(65) Prior Publication Data

US 2007/0245030 A1  Oct. 18, 2007

(51) Int. Cl.
G06F 7/00 (2006.01)
H04L 29/06 (2006.01)

(52) U.S. Cl.
CPC ................................ H04L 63/105 (2013.01)
USPC ..................................................... 707/781

(58) Field of Classification Search
None
See application file for complete search history.

(56) References Cited

U.S. PATENT DOCUMENTS

| | | | |
|---|---|---|---|
| 5,325,526 A | | 6/1994 | Cameron et al. |
| 5,355,474 A | * | 10/1994 | Thuraisngham et al. .......... 707/9 |
| 5,437,032 A | | 7/1995 | Wolf et al. |
| 5,590,266 A | * | 12/1996 | Carson et al. ................. 715/741 |
| 5,590,314 A | | 12/1996 | Ueno et al. |
| 5,784,706 A | | 7/1998 | Oberlin et al. |
| 5,841,869 A | | 11/1998 | Merkling et al. |
| 5,845,116 A | | 12/1998 | Saito et al. |
| 5,963,911 A | | 10/1999 | Walker et al. |
| 6,064,811 A | | 5/2000 | Spilo et al. |
| 6,074,427 A | | 6/2000 | Fought et al. |
| 6,075,938 A | | 6/2000 | Bugnion et al. |
| 6,112,228 A | * | 8/2000 | Earl et al. ...................... 709/205 |
| 6,279,046 B1 | | 8/2001 | Armstrong et al. |
| 6,289,462 B1 | | 9/2001 | McNabb et al. |
| 6,438,594 B1 | | 8/2002 | Bowman-Amuah |
| 6,557,168 B1 | | 4/2003 | Czajkowski |
| 6,633,963 B1 | | 10/2003 | Ellison et al. |
| 6,681,238 B1 | | 1/2004 | Brice et al. |

(Continued)

FOREIGN PATENT DOCUMENTS

EP  1043658 A1  10/2000
EP  1 253 516 A2  10/2002

(Continued)

OTHER PUBLICATIONS

Sun Microsystems, Inc., Part No. 817-6064-01 entitled, "System Administration Guide: Solaris Containers, Resource Management, and Zones" (246 pgs) dated Feb. 2004.

(Continued)

*Primary Examiner* — Apu Mofiz
*Assistant Examiner* — Thu Nga Nguyen
(74) *Attorney, Agent, or Firm* — Osha Liang LLP

(57) ABSTRACT

A secure windowing service is disclosed. When the windowing service receives an indication that a second client (executing in a second container) wishes to be given access to a set of windowing information provided by a first client (executing in a first container), the windowing service determines, based upon sensitivity labels associated with the first and second containers, whether the second client should be given access to the windowing information provided by the first client. By making this determination, the windowing service in effect implements information access control. This information access control helps to ensure that windowing information is not improperly passed from container to container.

9 Claims, 4 Drawing Sheets

(56) References Cited

U.S. PATENT DOCUMENTS

| | | |
|---|---|---|
| 6,681,258 B1 | 1/2004 | Ratcliff et al. |
| 6,701,460 B1 | 3/2004 | Suwandi et al. |
| 6,725,457 B1 | 4/2004 | Priem et al. |
| 6,792,514 B2 | 9/2004 | Kapoor et al. |
| 6,859,926 B1 | 2/2005 | Brenner et al. |
| 6,944,699 B1 | 9/2005 | Bugnion et al. |
| 6,957,435 B2 | 10/2005 | Armstrong et al. |
| 6,993,762 B1 | 1/2006 | Pierre |
| 7,051,340 B2 | 5/2006 | Fisher et al. |
| 7,076,634 B2 | 7/2006 | Lambeth et al. |
| 7,095,738 B1 | 8/2006 | Desanti |
| 7,096,469 B1 | 8/2006 | Kubala et al. |
| 2002/0083367 A1 | 6/2002 | McBride et al. |
| 2002/0120660 A1 | 8/2002 | Hay et al. |
| 2002/0124072 A1 | 9/2002 | Tormasov et al. |
| 2002/0156824 A1 | 10/2002 | Armstrong et al. |
| 2002/0173984 A1 | 11/2002 | Robertson et al. |
| 2002/0174215 A1 | 11/2002 | Schaefer |
| 2003/0014466 A1 | 1/2003 | Berger et al. |
| 2003/0069939 A1 | 4/2003 | Russell |
| 2004/0010624 A1 | 1/2004 | Garofalo et al. |
| 2004/0162914 A1 | 8/2004 | St. Pierre et al. |
| 2004/0210760 A1 | 10/2004 | McGrath et al. |
| 2004/0215848 A1 | 10/2004 | Craddock et al. |
| 2004/0226023 A1* | 11/2004 | Tucker .......................... 719/315 |
| 2006/0230042 A1* | 10/2006 | Butler et al. ....................... 707/9 |
| 2006/0248599 A1* | 11/2006 | Sack et al. ....................... 726/27 |
| 2007/0244898 A1* | 10/2007 | Cotner et al. ..................... 707/9 |
| 2008/0016354 A1* | 1/2008 | Wilding et al. ............... 713/171 |

FOREIGN PATENT DOCUMENTS

| | | |
|---|---|---|
| EP | 1282038 A2 | 2/2003 |
| EP | 1300766 A2 | 4/2003 |
| GB | 2301912 A | 12/1996 |
| WO | WO 00/45262 A2 | 8/2000 |

OTHER PUBLICATIONS

Mc Dougall, Richard, et al., "Resource Management", Prentice Hall, 1999, 25 pages.

Poul-Henning Kamp et al. "Jails: Confining SANE 2000", May 22-25, 2000.

Comm from the ACM ISNN 0001 to 0782 vol. 44 Issue 2, 2001 entitled "Operating System Approach Dalton, Choo" ACM Copyright 2001.

Sun Microsystems "Server 8 Operating Environment", Glenn Faden, Online, Feb. 2002.

Network Working Group entitled "IP Vers. 6 Addressing Architecture" by R. Hiden, Nokia Deering, Cisco dtd Jul. 1998.

IBM entitled "Partitioning for the IBM eserver pSeries 690 System", Copyright IBM 2001.

IBM System Partitioning on IBM eserver xSeries Servers and entitled "Effective Server Conso. Reserve Mgmt w/ IBM System" by Mark Chapman, dtd Dec. 2001.

Virtual Private Servers and Security Contexts dtd May 10, 2004.

SunSoft, A Sun Microsystems Inc Business entitled "File System Administration" 1994 Sun Microsystems.

Claims as Filed in European Patent Application No. 04252690.5, (6 pgs.).

Overview of Bandwidth Broker System [online], [retrieved on Jan. 31, 2005]. Retrieved from the internet: <URL: http://www.ittc.ku.edu/~kdrao/845/into.html>, (19 pgs).

Qbone Signaling Design Team Final Report [online], [retrieved on Jan. 31, 2005]. Retrieved from the internet: <URL: http://qos.internet2.edu/wg/documents-informational/20020709-chimento-etal-qbone-signaling.>, (33 pgs).

Sun Microsystems, "Sun EnterpriseTM 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.

Vance, Ashlee, "Solaris 10 to get Zoned," The Register, Apr. 9, 2003, XP007901426, located on the internet at http://www.theregister.co.uk/2003/04/09/solaris, retrieved on Dec. 7, 2006, 2 pages.

Current Claims, App. No. 04252688.9, 5 pages.

Current Claims, Foreign patent application 200410063136.3, 10 pages.

"CHMOD—Change the Permission Mode of a File," Internet Citation, Dec. 4, 2000, XP007901399, Retrieved from the internet at: http://www.cse.msu.edu/cgi-bin/man2html?chmod?1?/usr/man, retrieved in Dec. 4, 2006, 7 pages.

"SETFACL—Modify the Access Control List (ACL) for a File or Files," Internet Citation, Dec. 11, 2001, XP007901398, Retrieved from the Internet at: http://www.cse.msu.edu/cgi-bin/man2html?setfacl?1?/usr/man, retrieved on Dec. 4, 2006, 4 pages.

* cited by examiner

SECURE WINDOWING FOR LABELED CONTAINERS

BACKGROUND

In many computer implementations, it is desirable to limit access to information based upon accessibility level. This is especially true in a government context. For example, in a government security implementation, it is quite desirable, and most likely required, for top secret information to be accessible only by users and processes having the proper accessibility or clearance level (e.g. top secret clearance or above). It may also be desirable for users and processes having high clearance levels to be able to access information at lower levels (e.g. users and processes with top secret clearance can access need-to-know and public information). In order to implement such controls, one or more mechanisms need to be put in place to check the clearance levels of the users, processes, and information, and to determine whether certain accesses should be allowed. These mechanisms need to ensure that all possible sharing of information by processes are taken into account. If any potential sharing channel is missed, then that sharing channel may be the source of a security breach.

A windowing service of a computer system is a potential security breach. A windowing service is typically used by all of the processes in a computer system to perform windowing actions (e.g. drawing a window, putting content into a window, etc.). By invoking a windowing service, it is possible for a process to associate information with a display window. It is also possible for a process to invoke the windowing service to access information that was previously associated with the window, whether that information was provided by the requesting process or another process. Because of this ability to provide previously associated information, a windowing service can be used by a process as a mechanism for obtaining information provided by other processes. That being the case, unless the windowing service is endowed with capability to enforce accessibility restrictions, the windowing service can be exploited by a process to create a security breach.

SUMMARY

In accordance with one embodiment of the present invention, there is provided a windowing service with access control capability. This windowing service operates in conjunction with labeled containers to ensure that only the proper processes are granted access to certain window-associated information.

In one embodiment, a plurality of containers may be established within a global operating system environment. Each container, which for example may be an operating system partition (also referred to herein as a non-global zone), represents a separate virtual operating environment. Each container acts as a process isolation mechanism for isolating processes executing within that container from processes executing in other containers. Each container has its own unique sensitivity label. In one embodiment, each sensitivity label comprises a portion that specifies a sensitivity level, and a portion that specifies a category. The sensitivity level specifies where, in a sensitivity hierarchy, a particular container falls. For example, one container may have a sensitivity level that corresponds to "top secret" while another container may have a sensitivity level that corresponds to "need-to-know", which is lower than "top secret". The category portion specifies the matter to which the container pertains. For example, the category portion may specify a country (e.g. Iraq, Egypt, etc.), a particular matter (e.g. Iran Contra), etc. Together, the sensitivity level portion and the category portion form an overall unique sensitivity label for each container (e.g. "top secret Iraq", "need-to-know Egypt", etc.). These sensitivity labels may be used to determine whether the processes in one container may access windowing information provided by the processes of another container.

To illustrate, suppose that a request is received from a first client (which may, for example, be a process) to associate a set of information with a display window. This set of information may be content (e.g. text, graphics, etc.) that is displayed in the window, or it may be information (e.g. properties) that is associated with but not displayed in the window. Suppose further that the first client executes within a first container, and that the first container has a first sensitivity label associated therewith. In response to this request, the set of information is associated with the display window. Suppose now that an indication is received that a second client wishes to be given access to the set of information that was associated with the display window. Suppose further that the second client executes within a second container, and that the second container has a second sensitivity label associated therewith. Before giving the second client access to the set of information (which was provided by the first client), a determination is made as to whether the second client should be given access to the set of information. If it is determined that the second client should not be allowed access to the set of information, then access to the set of information is denied. On the other hand, if it is determined that the second client should be allowed access to the set of information, then access to at least a subset of the set of information is granted. By making this determination, it is ensured that only the proper processes are allowed to access the windowing information provided by the first client.

In one embodiment, the determination of whether the second client should be given access to the set of information is made based, at least partially, upon the first and second sensitivity labels. More specifically, in one embodiment, the second sensitivity label (which is associated with the second container in which the second client is executing) is compared with the first sensitivity label (which is associated with the first container in which the first client is executing), and if the second sensitivity label dominates the first sensitivity label, then it is determined that the second client should be allowed to access the set of information. In one embodiment, the second sensitivity label dominates the first sensitivity label if: (1) the second sensitivity label has a higher sensitivity level than the first sensitivity label; and (2) both the first and second sensitivity labels have the same category portion. For example, "top secret Iraq" dominates "need-to-know Iraq" but it does not dominate "need-to-know Egypt" because, even though it has a higher sensitivity level, it has a different category. By determining whether to give access to the set of information in this way, it is ensured that the windowing information (provided by the first client executing in the first container having the first sensitivity label) will be made accessible only to those clients that are executing in containers having dominating sensitivity labels. Doing so allows the set of information to be accessed by clients in different containers while at the same time ensuring that security is not compromised (there is no security breach since only clients with dominating sensitivity labels are allowed to access the information provided by clients with dominated sensitivity labels). In this manner, access control is enforced on windowing information.

DETAILED DESCRIPTION OF EMBODIMENT(S)

System Overview

Figure 1:
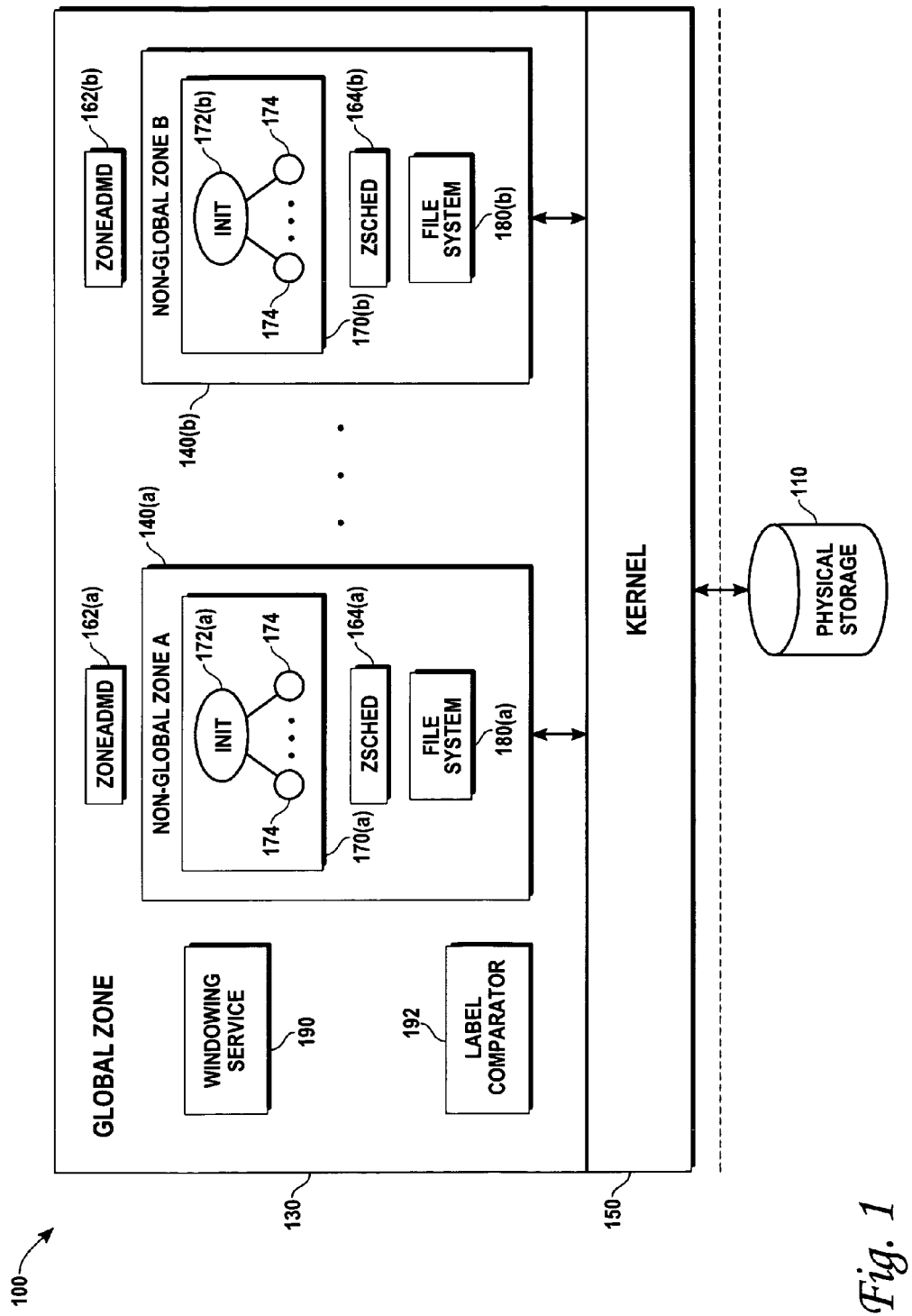
FIG. 1 shows a functional block diagram of a system in which one embodiment of the present invention may be implemented.

With reference to FIG. 1, there is shown a functional block diagram of a system in which one embodiment of the present invention may be implemented. In the system of FIG. 1, an operating system (OS) environment 100 is derived by executing an OS in a general-purpose computer system, such as computer system 400 illustrated in FIG. 4. For illustrative purposes, it will be assumed that the OS is Solaris manufactured by Sun Microsystems, Inc. of Santa Clara, Calif. However, it should be noted that the concepts taught herein may be applied to any OS, including but not limited to Unix, Linux, Windows, MacOS, etc.

As shown in FIG. 1, OS environment 100 may comprise one or more zones (also referred to herein as operating system partitions), including a global zone 130 and zero or more non-global zones 140 (also referred to as containers). The global zone 130 is the general OS environment that is created when the OS is booted and executed, and serves as the default zone in which processes may be executed if no non-global zones 140 are established. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140. As shown in FIG. 1, a windowing service 190 and a label comparator 192 may execute in the global zone 130. These components will be discussed in greater detail in a later section.

The non-global zones or containers 140 represent separate and distinct partitions of the OS environment 100. Each non-global zone 140 provides a separate virtual operating environment. One of the purposes of the non-global zones 140 is to provide isolation. In one embodiment, a non-global zone 140 can be used to isolate a number of entities, including but not limited to processes 170 and one or more file systems 180. Because of this isolation, processes 170 executing in one non-global zone 140 cannot access or affect processes in any other zone. Similarly, processes 170 in a non-global zone 140 generally cannot access or affect the file system 180 of another zone. As a result, the processes 170 in a non-global zone 140 are limited to accessing and affecting the processes and entities in that zone. Isolated in this manner, each non-global zone 140 behaves like a virtual standalone computer.

Having non-global zones 140 that are isolated from each other may be desirable in many implementations. For example, if a single computer system running a single instance of an OS is to be used to host applications and file systems having different security levels, it may be desirable to isolate the data and processes so that sensitive information does not leak from one set of data and processes to another. Partitioning an OS environment 100 into non-global zones 140 and hosting the different applications and file systems in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. In one embodiment, to prevent a non-global zone 140 from affecting other zones, the entities in a non-global zone 140 are generally not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, enforcement of the zone boundaries is carried out by the kernel 150 of the OS. More specifically, it is the kernel 150 that ensures that processes 170 in one non-global zone 140 are not able to access or affect the processes 170 or file systems 180 of another zone (non-global or global). In addition to enforcing the zone boundaries, kernel 150 also provides a number of other services. The operation of the kernel 150 will be discussed in greater detail in a later section.

Sensitivity Labels

In one embodiment, each non-global zone 140 has a unique sensitivity label associated therewith. This sensitivity label may be specified by a global zone administrator at the time that the administrator configures a non-global zone 140. As will be discussed in greater detail in a later section, this sensitivity label may be used by the windowing service 190 to implement information access control.

In one embodiment, a sensitivity label comprises two portions: (1) a sensitivity level portion; and (2) a category portion. The sensitivity level portion specifies a sensitivity level for the non-global zone 140. This sensitivity level is one of the levels in a sensitivity hierarchy, and specifies where in that hierarchy the non-global zone belongs. For example, if the sensitivity hierarchy includes the levels of "top secret", "secret", "need-to-know", and "public", where "top secret" is the highest, then if a non-global zone 140 has a sensitivity level of "secret", it is known that that non-global zone 140 is higher than "need-to-know" and "public" but lower than "top secret". The sensitivity level portion of a sensitivity label may be common among a plurality of non-global zones 140. Thus, for example, more than one non-global zone 140 may have a sensitivity level of "secret".

The category portion of the sensitivity label may be used to specify some particular aspect of a non-global zone 140. For example, the category portion may specify a country (e.g.

Iraq, Egypt, etc.) or some particular matter (e.g. Iran Contra) to which the information in the non-global zone 140 pertains. Like the sensitivity level portion, the category portion of a sensitivity label may be common among a plurality of non-global zones 140. Thus, for example, more than one non-global zone 140 may have a category of "Iraq".

While neither the sensitivity level portion nor the category portion in and of itself contains unique information, together, they form a unique sensitivity label for each non-global zone 140. Thus, for example, one non-global zone may have a sensitivity label of "top secret Iraq", while another may have a sensitivity label of "need-to-know Iraq", while another may have a sensitivity label of "need-to-know Egypt". In one embodiment, no two non-global zones 140 within the same global zone 130 have the same sensitivity label. In the above discussion, the sensitivity levels and categories are expressed in terms of words to best facilitate understanding; however, it should be noted that these portions may be expressed in any form (e.g. numbers, combination of numbers and text, etc.) that serve the same purposes.

Given the sensitivity labels for two non-global zones 140, it is possible to determine whether one non-global zone 140 dominates the other. Specifically, a second non-global zone dominates a first non-global zone if the sensitivity label of the second non-global zone (referred to as the second sensitivity label) dominates the sensitivity label of the first non-global zone (referred to as the first sensitivity label). In one embodiment, the second sensitivity label dominates the first sensitivity label if: (1) the second sensitivity label has a higher sensitivity level than the first sensitivity label; and (2) both the first and second sensitivity labels have the same category portion. Given these criteria, if the second sensitivity label is "top secret Iraq" and the first sensitivity label is "need-to-know Iraq", then the second sensitivity label dominates the first sensitivity label because the second sensitivity label has a higher sensitivity level ("top secret" is higher than "need-to-know") and both labels have the same category ("Iraq"). On the other hand, if the second sensitivity label is "top secret Iraq" and the first sensitivity label is "need-to-know Egypt", then there is no dominance because, even though the second sensitivity label has a higher sensitivity level, it has a different category ("Iraq" instead of "Egypt"). In such a case, the labels are said to be disjoint. In one embodiment, it is the label comparator 192 that makes the dominance determination. Given two sensitivity labels, the label comparator 192 determines: (1) whether the two labels are identical; and (2) if they are not identical, whether one of the labels dominates the other.

It should be noted that the above dominance criteria is just one of many ways for determining whether one sensitivity label dominates another. Other criteria may be used. For example, if so desired, the category portion of a sensitivity label may be ignored so that as long as a second sensitivity label has a higher sensitivity level than a first sensitivity label, the second sensitivity label is deemed to dominate the first sensitivity label. This and other ways of determining dominance may be used. All such criteria for determining dominance are within the scope of the present invention.

However it is determined, the significance of dominance is that it determines whether the processes of one non-global zone may be allowed to access the information provided by the processes of another non-global zone. As will be explained in a later section, the windowing service 190 uses the dominance determination to determine whether the windowing information provided by a client executing in one non-global zone may be accessed by a client executing in another non-global zone.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg(1m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, a sensitivity label, specification of zero or more mount points and entities to be mounted when the zone is readied, specification of devices to be configured when the zone is created, etc.

Once a zone is in the Configured state, a global administrator may invoke another operating system utility (in one embodiment, zoneadm(1m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm(1m) again), which causes a ZoneADMD process 162 to be started (there is a ZoneADMD process associated with each non-global zone). In one embodiment, ZoneADMD 162 runs within the global zone 130 and is responsible for managing its associated non-global zone 140. After ZoneADMD 162 is started, it interacts with the kernel 150 to establish the non-global zone 140. In establishing a non-global zone 140, a number of operations are performed. These operations include creating the non-global zone 140 (in one embodiment, this involves assigning a zone ID to the non-global zone 140, associating a sensitivity label with the zone (this sensitivity label was specified by the global zone administrator when the non-global zone was configured), creating a zone data structure which will be used by the kernel 150 to enforce and manage zone boundaries and information access, establishing the path to the root directory of the zone as the root of the zone's file system 180, etc.). The establishment operations may also include starting a zsched process 164 (zsched is a kernel process; however, it runs within the non-global zone 140, and is used to track kernel resources associated with the non-global zone 140), configuring devices, etc. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 within the non-global zone 140, so that the zone behaves like a virtual standalone computer.

After a non-global zone 140 is in the Ready state, it can be transitioned into the Running state by executing one or more user processes in the zone. In one embodiment, this is done by having ZoneADMD 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes or file systems in other zones. The application environment exists so long as one or more user processes are executing within the non-global zone 140.

After a non-global zone 140 is in the Running state, its associated ZoneADMD 162 can be used to manage it. ZoneADMD 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by ZoneADMD 162 to manage a non-global zone 140 on an ongoing basis during regular operation.

Windowing Service

During regular operation, the windowing service 190 may be invoked by any of the processes executing in the global zone 130 and the non-global zones 140 to implement windowing actions. By invoking the windowing service 190, a process may cause a display window to be opened, may cause some content to be displayed in a window, may associate some data with a window as properties, etc. A process may also invoke the windowing service 190 to obtain information that was previously placed into or associated with a window, whether that information was originally provided by the requesting process or not. Because the windowing service 190 services all processes, and because it can potentially provide to one process executing in one non-global zone 140 information that was originally provided by another process executing in another non-global zone 140, the windowing service 190 can be the source of a security breach. To prevent this from happening, the windowing service 190, in one embodiment, implements some information access control functionality. To illustrate how the windowing service 190 may operate in accordance with one embodiment of the present invention, reference will now be made to some examples.

Figure 2:
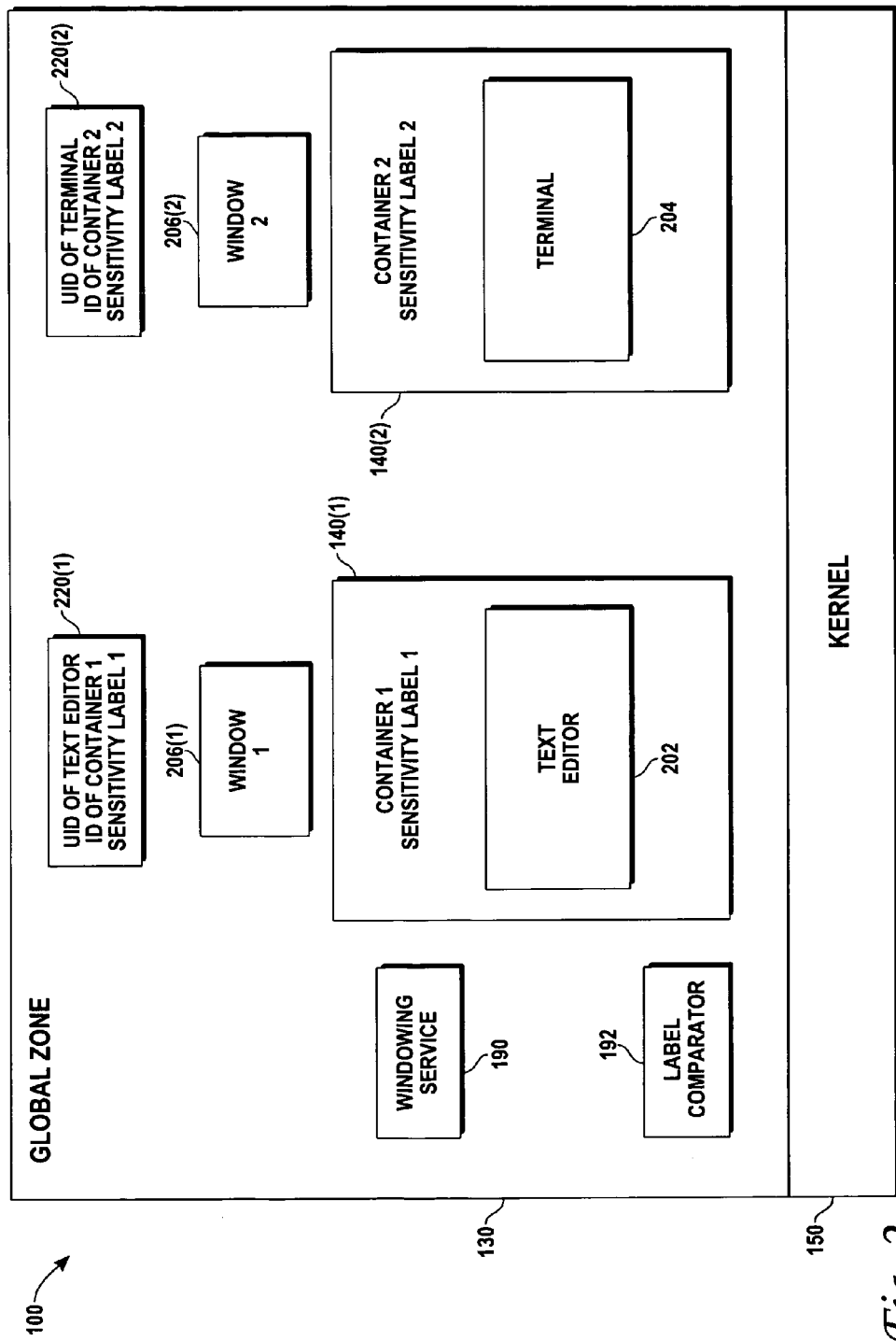
FIG. 2 is a functional block diagram illustrating one mode of operation of one embodiment of the present invention.

With reference to FIG. 2, suppose that two non-global zones 140(1), 140(2) (hereinafter referred to as containers) are established within the global zone 130. Container 140(1) has a sensitivity label 1 associated therewith and container 140(2) has a sensitivity label 2 associated therewith. Suppose further that a text editor process 202 is started within container 140(1). When the text editor 202 is started, it invokes the windowing service 190 to create a new window 206(1) in which text may be entered and displayed. The first time the text editor 202 communicates with the windowing service 190, the windowing service 190 creates a new connection for the text editor 202.

In one embodiment, to create the new connection, the windowing service 190 invokes the kernel 150 to obtain some information pertaining to the text editor 202. In response to this invocation, the kernel 150 determines, from a set of information associated with the text editor 202, that the text editor 202 is executing in container 140(1) (in one embodiment, when a process is started within a container, the kernel associates the ID of the container with that process; based on that association, the kernel 150 can determine in which container the process is executing). Given this determination, the kernel 150 ascertains the ID of the container 140(1). Using this ID, the kernel 150 accesses a set of information associated with the container 140(1), and extracts therefrom the sensitivity label associated with the container 140(1), and perhaps some other information pertaining to the container 140(1). The kernel 150 may also obtain some information pertaining to the text editor 202 (e.g. the UID associated with the text editor 202 that determines the privileges that the text editor 202 has). Thereafter, the kernel 150 provides the gathered information to the windowing service 190. In response, the windowing service 190 creates a first connection data structure 220(1), stores the gathered information (which, in one embodiment, includes the ID of the container 140(1), the sensitivity label associated with the container 140(1), and the UID associated with the text editor 202) into the first connection data structure 220(1), and associates that data structure 220(1) with the text editor 202. The new connection is thus created. The text editor 202 may thereafter use that connection to interact with the windowing service 190. The text editor 202 is now a client of the windowing service 190. After the connection is created, the text editor 202 uses the connection to invoke the windowing service 190 to create the new window 206(1). In response, the windowing service 190 creates the new window 206(1), and makes the text editor 202 the owner of the window 206(1).

Suppose now that a terminal process 204 (which enables a user to type in commands and view responses) is started within container 140(2). When the terminal 204 is started, it invokes the windowing service 190 to create a new window 206(2) in which commands may be entered and responses may be viewed. The first time the terminal 204 communicates with the windowing service 190, the windowing service 190 creates a new connection for the terminal 204. This connection may be created in a manner similar to that described above in connection with the text editor 202.

Specifically, the windowing service 190 invokes the kernel 150 to obtain some information pertaining to the terminal 204. In response to this invocation, the kernel 150 determines that the terminal 204 is executing in container 140(2). Given this determination, the kernel 150 ascertains the ID of the container 140(2), the sensitivity label associated with the container 140(2), and perhaps other information pertaining to the container 140(2). The kernel 150 may also ascertain some information pertaining to the terminal 204 (e.g. the UID associated with the terminal 204 that determines the privileges that the terminal 204 has). Thereafter, the kernel 150 provides the gathered information to the windowing service 190. In response, the windowing service 190 creates a second connection data structure 220(2), stores the gathered information (which, in one embodiment, includes the ID of the container 140(2), the sensitivity label associated with the container 140(2), and the UID associated with the terminal 204) into the second connection data structure 220(2), and associates that data structure 220(2) with the terminal 204. The new connection is thus created. The terminal 204 (which is now a client of the windowing service) thereafter uses that connection to invoke the windowing service 190 to create the new window 206(2). In response, the windowing service 190 creates the new window 206(2), and makes the terminal 204 the owner of the window 206(2).

Thus far, very little information has been associated with the windows 206. Suppose now that the windowing service 190 receives a request from the text editor 202 to associate a set of information with the window 206(1). This set of information may be content that the text editor 202 wishes to have displayed in the window 206(1), or it may be other information, such as window properties, that the text editor 202 wishes to associate with the window 206(1). In response to this request, the windowing service 190 checks and confirms that the text editor 202 owns the window 206(1). That being the case, the windowing service 190 honors the request and associates the set of information with the window 206(1). The window 206(1) is thus updated.

Suppose now that a user types a command into the terminal 204 to obtain information that has been associated with window 206(1) (note that window 206(1) is not owned by the terminal 204; thus, the terminal 204 is trying to obtain information associated with a window that it does not own). When this command is received by the windowing service 190, the windowing service 190 perceives the command as an indication that the terminal 204 wishes to be given access to the information associated with window 206(1). Before it grants this access, the windowing service 190 first determines whether the terminal 204 should be allowed access to this information. In one embodiment, the windowing service 190 makes this determination based, at least partially, upon the sensitivity labels of the two containers 140(1), 140(2). The determination may be made as follows.

When the windowing service 190 receives the command from the terminal 204 to obtain information associated with window 206(1), the windowing service 190 consults the connection data structure 220(2) associated with the terminal 204. From that connection data structure 220(2), the windowing service 190 extracts sensitivity label 2. This is the sensitivity label of the container 140(2) in which the terminal 204 is executing.

From the command, the windowing service 190 knows that it is window 206(1) that is the subject of the command. The windowing service 190 also knows that window 206(1) is owned by text editor 202. Thus, the windowing service 190 knows to access the connection data structure 220(1) associated with the text editor 202. From this connection data structure 220(1), the windowing service 190 extracts sensitivity label 1. This is the sensitivity label of the container 140(1) in which the text editor 202 is executing. The windowing service 190 now has the sensitivity labels of both containers 140(1), 140(2).

Thereafter, the windowing service 190 passes the sensitivity labels to the label comparator 192 for comparison. In one embodiment, the comparator 192 makes two determinations: (1) whether the two sensitivity labels are identical; and (2) if the two sensitivity labels are not identical, whether sensitivity label 2 dominates sensitivity label 1. The dominance determination may be made in the manner described previously. The results of these determinations are returned by the comparator 192 to the windowing service 190.

If the result of the comparison indicates that the two sensitivity labels are identical (thereby meaning that the terminal 204 and the text editor 202 are executing in the same container 104), then the windowing service 190 grants the terminal 204 access to at least a portion if not all of the information associated with the window 206(1). In one embodiment, this access would be both read and write access. In the current example, the terminal 204 and the text editor 202 are executing in different containers 140(1), 140(2); thus, the two sensitivity labels cannot be identical. In such a case, the windowing service 190 goes further to determine, based upon the results provided by the comparator 192, whether sensitivity label 2 dominates sensitivity label 1. If it does not, then the windowing service 190 concludes that the terminal 204 should not be allowed access to the information associated with window 206(1). In such a case, the windowing service 190 denies the terminal 204 access to the information. On the other hand, if sensitivity label 2 does dominate sensitivity label 1, then the windowing service 190 concludes that the terminal 204 should be allowed access to the information associated with window 206(1). In such a case, the windowing service 190 grants the terminal 204 access to at least a portion if not all of the information associated with window 206(1). In one embodiment, the access granted to the terminal 204 would be read access only, not write access; thus, the terminal 204 can read but not modify the information associated with window 206(1). In this manner, the windowing service 190 implements information access control to ensure that only clients with the proper sensitivity labels are allowed to access windowing information originated by other clients.

In the above example, for the sake of simplicity, there is no discussion of how the UID associated with each process 202, 204 may affect whether one process may access the windowing information provided by another process. It should be noted, though, that the windowing service 190 may take the UID's of the processes into account in making the access determination. Thus, even though the sensitivity labels may indicate that one process should be allowed to access the windowing information provided by another process, the windowing service 190 may decide, based upon the UID's, that access should still be denied. This may be due, for example, to the fact that the UID associated with one process may not have sufficient privilege to access the windowing information of another process. This and other implementations are within the scope of the present invention.

The above example deals with the case in which a window 206 is owned and updated by one client. This covers most scenarios, but not all. There may be windows (for example, root windows) which are not owned by any particular client but may be updated by multiple clients. For such windows, the windowing service 190 operates slightly differently. To illustrate this operation in accordance with one embodiment of the present invention, reference will be made to FIG. 3.

Figure 3:
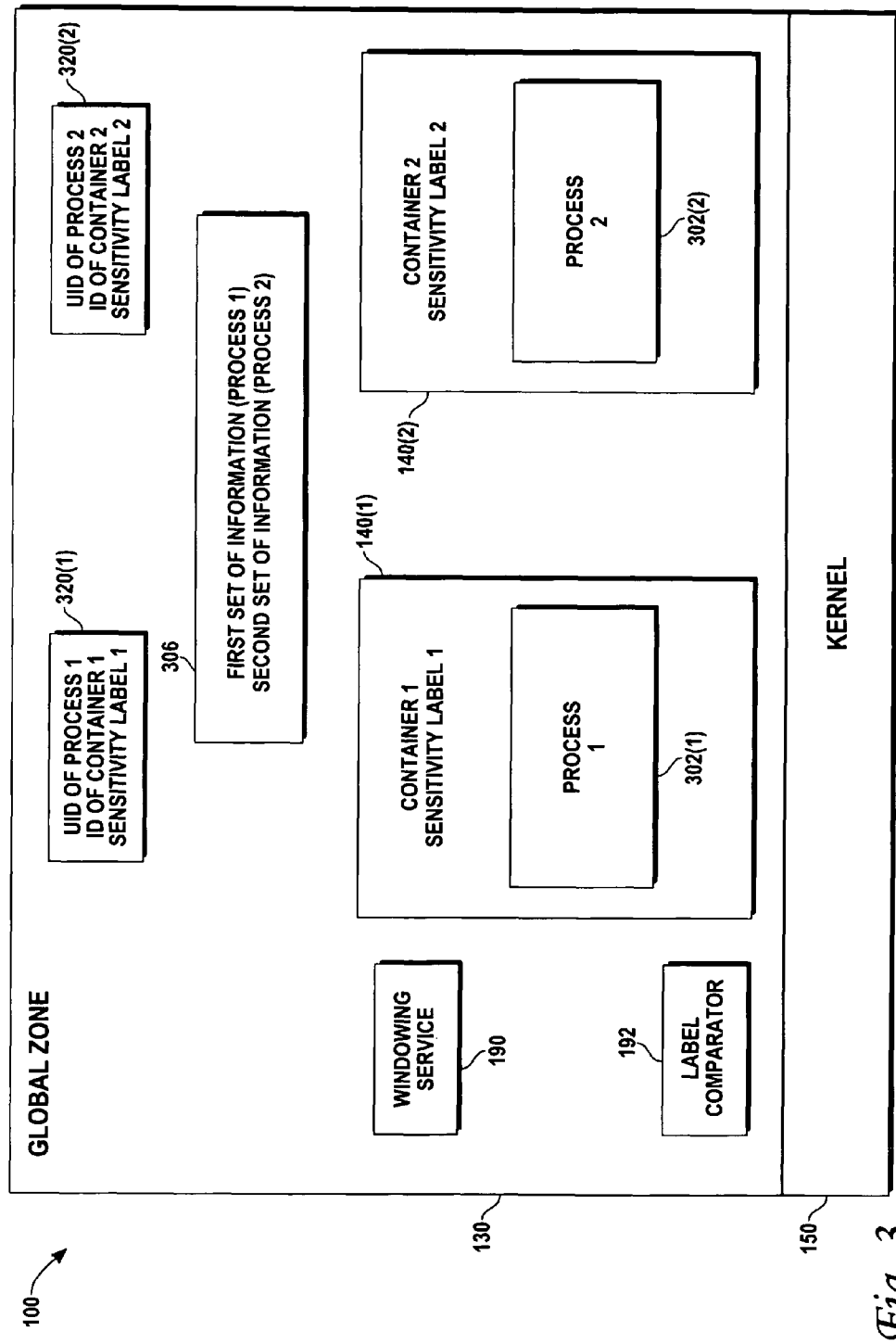
FIG. 3 is a functional block diagram illustrating another mode of operation of one embodiment of the present invention.

FIG. 3 shows a scenario in which two containers 140(1), 140(2) have been established within the global zone 130. Container 140(1) has a sensitivity label 1 associated therewith, and container 140(2) has a sensitivity label 2 associated therewith. A process 1 302(1) is executing within container 140(1) and a process 2 is executing within container 104(2). In the scenario of FIG. 3, a connection has already been established between process 1 302(1) and the windowing service 190 (this connection may be established in the manner described above); thus, a connection data structure 320(1) has been created for this connection. Process 1 is now a client of the windowing service 190. Similarly, a connection has been established between process 2 302(2) and the windowing service 190 (this connection may be established in the manner described above); thus, a connection data structure 320(2) has been created for this connection. Process 2 is now a client of the windowing service 190.

FIG. 3 also shows a root window 306. This root window 306 is the base window that is started when the windowing service 190 starts. It is in this window 306 that all other windows are shown. The root window 306 is not owned by any particular user process but it can be updated (i.e. information can be associated with it) by multiple user processes. To illustrate how the windowing service 190 operates in this setting in accordance with one embodiment of the present invention, reference will now be made to an example.

Suppose that the windowing service 190 receives a request from process 1 302(1) to associate a first set of information with the root window 306. This set of information may be content that is to be displayed within the root window 306 or it may be information, such as properties, that is to be associated with but not displayed in the window 306. In response to this request, the windowing service 190 associates the first set of information with the root window 306. As part of this process, the windowing service 190 stores information indicating that this set of information was provided by process 1 302(1).

Suppose further that the windowing service 190 receives a request from process 2 302(2) to associate a second set of information with the root window 306. Again, this set of information may be content that is to be displayed within the root window 306 or it may be information, such as properties, that is to be associated with but not displayed in the window 306. In response to this request, the windowing service 190 associates the second set of information with the root window 306. As part of this process, the windowing service 190 stores information indicating that this set of information was provided by process 2 302(2). The root window 306 now has multiple sets of information associated therewith that were provided by multiple different processes.

Suppose now that the windowing service 190 receives a request from process 1 302(1) to obtain all of the information that has been associated with the root window 306. Because the root window 306 may comprise information sets provided by multiple different processes, the windowing service 190 does not automatically honor this request. Rather, it checks each set of information that has been associated with the root window 190, and determines whether process 1 302(1) should be given access to that set of information. This check may be carried out as follows.

Initially, the windowing service 190 checks the first set of information. It knows, from the information that it stored with the first set of information, that it was process 1 302(1) that provided the first set of information. Since it is process 1 302(1) that is now requesting the information, the windowing service 190 grants the requested access to the first set of information. In one embodiment, the access granted to process 1 302(1) would be read and write access.

The windowing service 190 thereafter checks the second set of information. From the information that it stored with the second set of information, the windowing service 190 determines that it was process 2 302(2) that provided the second set of information. That being the case, before it grants access to the second set of information, the windowing service 190 determines whether process 1 302(1) should be given access to information provided by process 2 302(2). In one embodiment, the windowing service 190 makes this determination as follows. Initially, the windowing service 190 accesses the connection data structure 320(1) for process 1 302(1), and extracts the sensitivity label 1 therefrom. Sensitivity label 1 is the sensitivity label associated with the container 140(1) in which process 1 302(1) is executing. The windowing service 190 also accesses the connection data structure 320(2) for process 2 302(2), and extracts the sensitivity label 2 therefrom. Sensitivity label 2 is the sensitivity label associated with the container 140(2) in which process 2 302(2) is executing. Once it has the sensitivity labels for both containers 140(1), 140(2), the windowing service 190 passes the sensitivity labels to the label comparator 192 for comparison.

If the result of the comparison indicates that the two sensitivity labels are identical (thereby meaning that process 1 302(1) and process 2 302(2) are executing in the same container 104), then the windowing service 190 grants process 1 302(2) access to the second set of information. In one embodiment, this access would be read and write access. In the current example, process 1 302(1) and process 2 302(2) are executing in different containers 140(1), 140(2); thus, the two sensitivity labels cannot be identical. In such a case, the windowing service 190 goes further to determine, based upon the results provided by the comparator 192, whether sensitivity label 1 dominates sensitivity label 2. If it does not, then the windowing service 190 concludes that process 1 302(1) should not be allowed access to the second set of information. In such a case, the windowing service 190 denies process 1 302(1) access to the second set of information. On the other hand, if sensitivity label 1 does dominate sensitivity label 2, then the windowing service 190 concludes that process 1 302(1) should be allowed access to the second set of information. In such a case, the windowing service 190 grants process 1 302(1) access to at least a portion if not all of the second set of information. In one embodiment, the access granted to the process 1 302(1) would be read access only, not write access; thus, the process 1 302(1) can read but not modify the second set of information. In this manner, the windowing service 190 implements information access control on an information set-by-information set basis to ensure that only the proper sets of information are made accessible to process 1 302(1).

To complete the example, suppose that the windowing service 190 receives a request from process 2 302(2) to obtain all of the information that has been associated with the root window 306. Because the root window 306 may comprise information sets provided by multiple different processes, the windowing service 190 does not automatically honor this request. Rather, it checks each set of information that has been associated with the root window 190, and determines whether process 2 302(2) should be given access to that set of information. This check may be carried out as follows.

Initially, the windowing service 190 checks the first set of information. From the information that it stored with the first set of information, the windowing service 190 determines that it was process 1 302(1) that provided the first set of information. That being the case, before it grants access to the first set of information, the windowing service 190 determines whether process 2 302(2) should be given access to information provided by process 1 302(1). In one embodiment, the windowing service 190 makes this determination as follows. Initially, it accesses the connection data structure 320(2) for process 2 302(2), and extracts the sensitivity label 2 therefrom. Sensitivity label 2 is the sensitivity label associated with the container 140(2) in which process 2 302(2) is executing. The windowing service 190 also accesses the connection data structure 320(1) for process 1 302(1), and extracts the sensitivity label 1 therefrom. Sensitivity label 1 is the sensitivity label associated with the container 140(1) in which process 1 302(1) is executing. Once it has the sensitivity labels for both containers 140(1), 140(2), the windowing service 190 passes the sensitivity labels to the label comparator 192 for comparison.

If the result of the comparison indicates that the two sensitivity labels are identical (thereby meaning that process 1 302(1) and process 2 302(2) are executing in the same container 104), then the windowing service 190 grants process 2 302(2) access to the first set of information. In one embodiment, this access would be read and write access. In the current example, process 1 302(1) and process 2 302(2) are executing in different containers 140(1), 140(2); thus, the two sensitivity labels cannot be identical. In such a case, the windowing service 190 goes further to determine, based upon the results provided by the comparator 192, whether sensitivity label 2 dominates sensitivity label 2. If it does not, then the windowing service 190 concludes that process 2 302(2)

should not be allowed access to the first set of information. In such a case, the windowing service 190 denies process 2 302(2) access to the first set of information. On the other hand, if sensitivity label 2 does dominate sensitivity label 1, then the windowing service 190 concludes that process 2 302(2) should be allowed access to the first set of information. In such a case, the windowing service 190 grants process 2 302(2) access to at least a portion if not all of the first set of information. In one embodiment, the access granted to process 2 302(2) would be read access only, not write access; thus, process 2 302(2) can read but not modify the first set of information.

The windowing service 190 thereafter checks the second set of information. It knows, from the information that it stored with the second set of information, that it was process 2 302(2) that provided the second set of information. Since it is process 2 302(2) that is now requesting the information, the windowing service 190 grants the requested access to the second set of information. In one embodiment, the access granted to process 2 302(2) would be read and write access. In this manner, the windowing service 190 implements information access control on an information set-by-information set basis to ensure that only the proper sets of information are made accessible to process 2 302(2).

Hardware Overview

Figure 4:
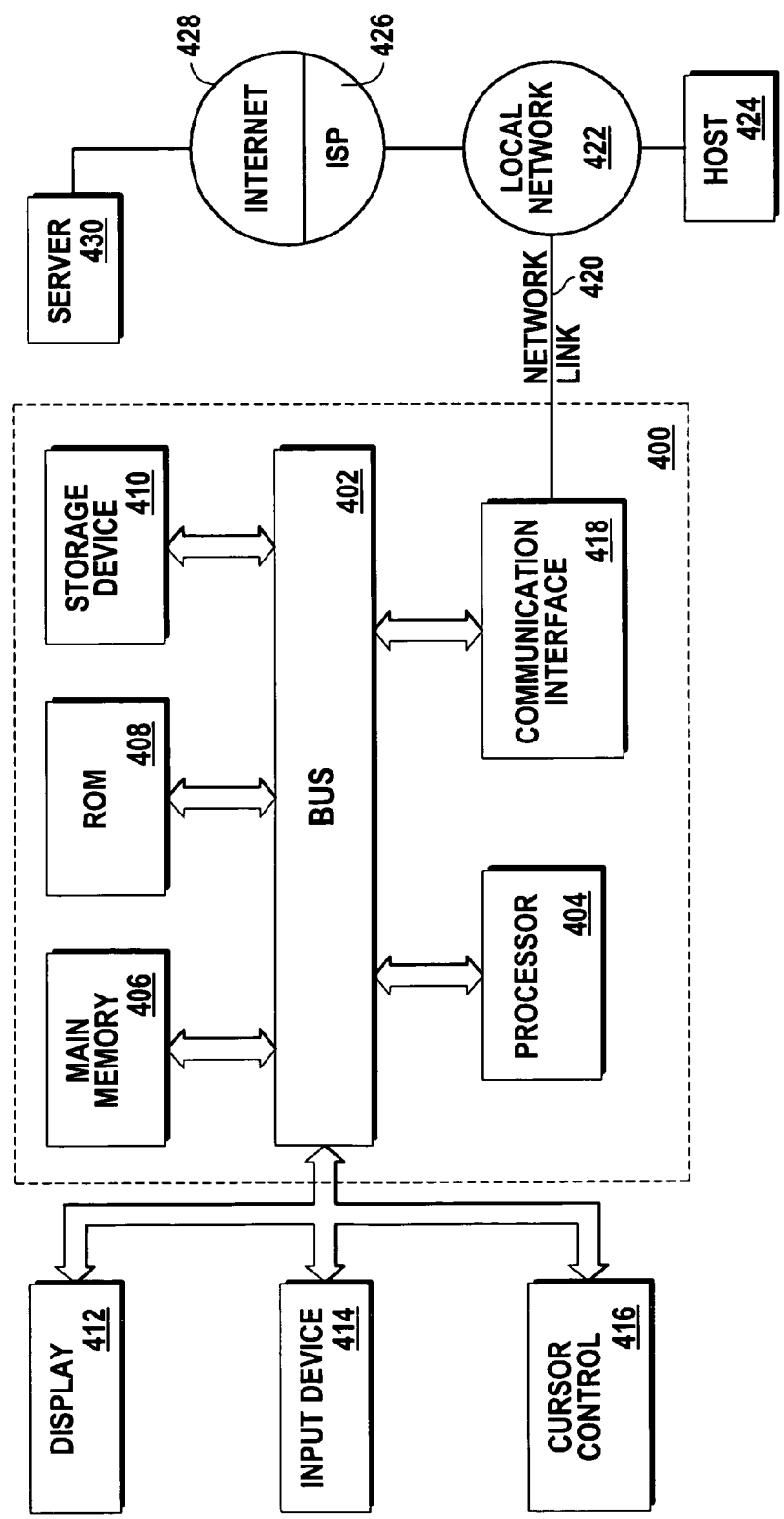
FIG. 4 is a block diagram of a general purpose computer system in which one embodiment of the present invention may be implemented.

In one embodiment, the windowing service 190, the label comparator 192, and the OS, which includes kernel 150, may take the form of sets of instructions that are executed by one or more processors. If they take the form of sets of instructions, FIG. 4 shows a block diagram of a computer system 400 upon which these sets of instructions may be executed. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may further be a network connection that connects one or more of the components. Any mechanism and/or medium that enables information, signals, data, etc., to be exchanged between the various components may be used as bus 402.

Bus 402 may also be a combination of these mechanisms/ media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/ or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. For example, in FIG. 1, the windowing service 190 and the label comparator 192 are shown as separate components. While this is one possible embodiment, it should be noted that other embodiments are also possible. For example, the functionality of the label comparator 192 may be incorporated into the windowing service 190, the kernel 150, or some other component. These and other modifications are within the scope of the present invention. Thus, the invention should not be limited by the specific embodiments used to illustrate it but only by the scope of the issued claims and the equivalents thereof.

What is claimed is:

1. A non-transitory machine readable storage medium, comprising instructions for causing one or more processors to execute a method, the method comprising:

receiving, by a windowing service executing within an operating system (OS), a request from a first process to associate a first set of information with a display window, wherein the first process is one of a first plurality of processes executing within a first container on the OS on a host, wherein the first container comprises the first plurality of processes executing on at least one processor on the host, and wherein the first container has a first sensitivity label associated therewith;

associating, by the windowing service, the first set of information with the display window in response to the request;

receiving, by the windowing service, a request from a second process to access the first set of information, wherein the request from the second process targets the display window, wherein the second process is one of a second plurality of processes executing within a second container on the OS, wherein the second container comprises the second plurality of processes executing on at least one processor on the host, wherein the first plurality of processes is isolated from the second plurality of processes, wherein the second plurality of processes is isolated from the first plurality of processes, and wherein the second container has a second sensitivity label associated therewith;

determining, by the windowing service using the first sensitivity label and the second sensitivity label, whether the second process should be allowed access to the first set of information;

denying, by the windowing service, in response to a determination that the second process should not be allowed access to the first set of information, the second process access to the first set of information; and granting, by the windowing service, in response to a determination that the second process should be allowed access to the first set of information, access to at least a subset of the first set of information to the second process.

2. The non-transitory machine readable storage medium of claim 1, wherein determining whether the second process should be allowed access to the first set of information comprises:

comparing the first sensitivity label and the second sensitivity label to determine whether they are identical; and concluding, in response to a determination that the first sensitivity label and the second sensitivity label are identical, that the second process should be allowed access to at least the subset of the first set of information.

3. The non-transitory machine readable storage medium of claim 1, wherein determining whether the second process should be allowed access to the first set of information comprises:

comparing the first sensitivity label and the second sensitivity label to determine whether the second sensitivity label has a higher sensitivity level than the first sensitivity label; and concluding, in response to a determination that the second sensitivity label has a higher sensitivity level than the first sensitivity label, that the second process should be allowed access to at least the subset of the first set of information.

4. The non-transitory machine readable storage medium of claim 1, wherein determining whether the second process should be allowed access to the first set of information comprises:

comparing the first sensitivity label and the second sensitivity label to determine whether the second sensitivity label dominates the first sensitivity label; and concluding, in response to a determination that the second sensitivity label dominates the first sensitivity label, that the second process should be allowed access to at least the subset of the first set of information.

5. The non-transitory machine readable storage medium of claim 4, wherein each sensitivity label has a sensitivity level portion and a category portion, and wherein comparing the first sensitivity label and the second sensitivity label to determine whether the second sensitivity label dominates the first sensitivity label comprises:

determining whether the second sensitivity label has a higher sensitivity level than the first sensitivity label; and determining whether a category portion of the first sensitivity label is identical to a category portion of the second sensitivity label.

6. The non-transitory machine readable storage medium of claim 1, further comprising instructions for causing one or more processors to perform a method, the method comprising:

receiving a second request from the second process to associate a second set of information with the display window;

associating the second set of information with the display window in response to the second request;

receiving an indication that the first process wishes to be given access to the second set of information;

determining, based at least partially upon the first sensitivity label and the second sensitivity label, whether the first process should be allowed access to the second set of information;

denying, in response to a determination that the first process should not be allowed access to the second set of information, the first process access to the second set of information; and granting, in response to a determination that the first process should be allowed access to the second set of information, access to at least a subset of the second set of information to the first process.

7. The non-transitory machine readable storage medium of claim 6, wherein the first set of information is associated with the first process and the second set of information is associated with the second process.

8. The non-transitory machine readable storage medium of claim 7, wherein determining whether the second process should be allowed access to the first set of information comprises:

determining that the first set of information is associated with the first process;

determining that the first process has the first sensitivity label associated therewith; and determining that the second process has the second sensitivity label associated therewith.

9. The non-transitory machine readable storage medium of claim 7, wherein determining whether the first process should be allowed access to the second set of information comprises:

determining that the second set of information is associated with the second process;

determining that the second process has the second sensitivity label associated therewith; and determining that the first process has the first sensitivity label associated therewith.

* * * * *